United States Patent [19]

Isozaki et al.

[11] Patent Number: 5,079,312
[45] Date of Patent: Jan. 7, 1992

[54] PROCESS FOR PREPARING POLYSILOXANE-CONTAINING RESIN

[75] Inventors: Osamu Isozaki, Yokohama; Noboru Nakai, Hiratsuka; Koichiro Murata, Kanagawa, all of Japan

[73] Assignee: Kansai Paint Company, Limited, Amagasaki, Japan

[21] Appl. No.: 522,401

[22] Filed: May 11, 1990

Related U.S. Application Data

[63] Continuation of Ser. No. 15,398, Feb. 17, 1987, abandoned.

[30] Foreign Application Priority Data

Feb. 25, 1986 [JP] Japan ............................ 61-40923

[51] Int. Cl.$^5$ ............................................ C08F 283/12
[52] U.S. Cl. ................................. 525/479; 526/279;
528/25; 528/26; 528/32; 524/755; 524/761;
524/765; 524/770; 524/773; 524/858
[58] Field of Search .............. 526/279; 525/479;
528/25, 32, 26; 524/755, 761, 765, 770, 773, 858

[56] References Cited

U.S. PATENT DOCUMENTS

| | | | |
|---|---|---|---|
| 2,486,162 | 10/1949 | Hyde | 528/25 |
| 4,123,472 | 10/1978 | Getson et al. | 525/479 |
| 4,413,104 | 10/1983 | Deubzer et al. | 525/479 |
| 4,618,644 | 10/1986 | Liu | 524/535 |

OTHER PUBLICATIONS

Noll, Walter, *Chemistry and Technology of Silicones*, Academic Press, New York, 1968, pp. 192-193.

*Primary Examiner*—Melvyn I. Marquis
*Assistant Examiner*—R. Dean, Jr.
*Attorney, Agent, or Firm*—Armstrong, Nikaido, Marmelstein, Kubovcik & Murray

[57] ABSTRACT

The invention provides a process for preparing a polysiloxane-containing resin which comprises copolymerizing a polysiloxane-type macromonomer with a vinyl monomer, characterized in that the polysiloxane-type macromonomer is one prepared by reacting about 70 to about 99.999 mole % of a compound (A) represented by the formula

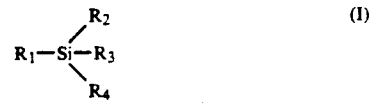

wherein $R_1$ represents aliphatic hydrocarbon group having 1 to 8 carbon atoms or phenyl group, and $R_2$, $R_3$ and $R_4$ each represent alkoxyl group having 1 to 4 carbon atoms or hydroxyl group with about 30 to about 0.001 mole % of a compound (B) represented by the formula

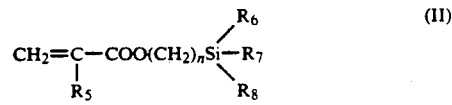

wherein $R_5$ represents hydrogen atom or methyl group, $R_6$, $R_7$ and $R_8$ each represent hydroxyl group, alkoxyl group having 1 to 4 carbon atoms or aliphatic hydrocarbon group having 1 to 8 carbon atoms with the proviso that $R_6$, $R_7$ and $R_8$ can not be aliphatic hydrocarbon groups having 1 to 8 carbon atoms at the same time, and n is an integer of 1 to 6, the polysiloxane-type macromonomer having at least two free functional groups selected from hydroxyl groups and alkoxyl groups per molecule, and the macromonomer having a number-average molecular weight of about 400 to about 100,000.

13 Claims, No Drawings

PROCESS FOR PREPARING POLYSILOXANE-CONTAINING RESIN

This application is a continuation of application Ser. No. 015,398 filed Feb. 17, 1987, now abandoned.

This invention relates to a process for preparing a polysiloxane-containing resin, and more particularly to a process for preparing a vinyl polymer having multi-functional polysiloxane at the side chain.

It is known to improve the characteristics of vinyl polymer by introducing polysiloxane into the side chain thereof.

Known processes for introducing polysiloxane into the side chain of vinyl polymer include, for example, a process for preparing a graft copolymer having polysiloxane group at the side chain by radically copolymerizing a polysiloxane group-containing monomer with an ethylenically unsaturated mono- or di-ene monomer (Japanese Unexamined Patent Publication No. 231720/1985). This process has, however, the following drawbacks. None of functional groups such as alkoxyl group and hydroxyl group exist in the polysiloxane side chain of the polymer prepared by the process. Accordingly the polymer thus prepared is extremely poor in crosslinking property. In addition, the polymers are further defective in being low, in compatibility with other components (other vinyl polymer and polysiloxane, etc.) which have not participated in the reaction for producing the polysiloxane-containing vinyl polymer, with the result that the liquid reaction product tends to become turbid. If reaction ratio is enhanced to prevent the reaction product from getting turbid, the reaction product is prone to gelation.

Another example of processes for preparing a polysiloxane-containing resin is a process for preparing a graft copolymer by radically copolymerizing a radically polymerizable monomer with an acryl-modified silicone which is a condensation product of silicone and acrylic compound (Japanese Unexamined Patent Publication No. 167606/1983). This process can introduce alkoxyl, hydroxyl or like functional group into the polysiloxane side chain of the vinyl polymer but two non-functional groups such as alkyl group and phenyl group exist as bonded to Si having the functional group attached thereto so that the reactivity of the functional group is insufficient from a viewpoint of chemical structure. Accordingly this process gives a polysiloxane-containing resin unsatisfactory in crosslinking property and in compatibility with other components.

It is an object of the present invention to provide a process for preparing a polysiloxane-containing vinyl polymer having an improved crosslinking property.

It is another object of the invention to provide a process for preparing a polysiloxane-containing vinyl polymer having a high compatibility with other organic resins and the like.

It is a further object of the invention to provide a process for preparing a polysiloxane-containing vinyl polymer which is outstanding in water repellency, water resistance, chemical resistance, weatherability, mar resistance, heat resistance, stain resistance, etc.

Other objects and features of the invention will become apparent from the following description.

This invention provides a process for preparing a polysiloxane-containing resin which comprises copolymerizing a polysiloxane-type macromonomer with a vinyl monomer, characterized in that the polysiloxane-type macromonomer is one prepared by reacting about 70 to about 99.999 mole % of a compound (A) represented by the formula

wherein $R_1$ represents aliphatic hydrocarbon group having 1 to 8 carbon atoms or phenyl group, and $R_2$, $R_3$ and $R_4$ each represent alkoxyl group having 1 to 4 carbon atoms or hydroxyl group with about 30 to about 0.001 mole % of a compound (B) represented by the formula

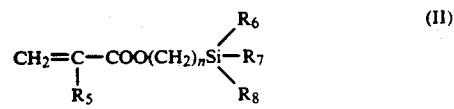

wherein $R_5$ represents hydrogen atom or methyl group, $R_6$, $R_7$ and $R_8$ each represent hydroxyl group, alkoxyl group having 1 to 4 carbon atoms or aliphatic hydrocarbon group having 1 to 8 carbon atoms with the proviso that $R_6$, $R_7$ and $R_8$ can not be aliphatic hydrocarbon groups having 1 to 8 carbon atoms at the same time, and n is an integer of 1 to 6, the polysiloxane-type macromonomer having at least two free functional groups selected from hydroxyl groups and alkoxyl groups per molecule, and the macromonomer having a number-average molecular weight of about 400 to about 100,000.

According to the process of this invention, a polysiloxane side chain with at least two free functional groups can be introduced into a vinyl polymer by copolymerizing a vinyl monomer with a polysiloxane-type macromonomer which is prepared by reacting the compound (A) and the compound (B) and which has at least two free functional groups selected from hydroxyl groups and alkoxyl groups.

In the vinyl polymer thus prepared, the functional groups at the side chain are high in reactivity and at least two such reactive functional groups are present. Therefore, the polymer is improved in crosslinking property and compatibility with other resins and the like. Furthermore, the polymer has the siloxane bond-containing side chain which serves to improve the properties of the polymer including water repellency, water resistance, chemical resistance, weatherability, heat resistance, stain resistance, mar resistance and the like.

The polysiloxane-type macromonomer to be used in this invention can be prepared by reacting a compound (A) represented by the formula

wherein $R_1$, $R_2$, $R_3$ and $R_4$ are as defined above with a compound (B) represented by the formula

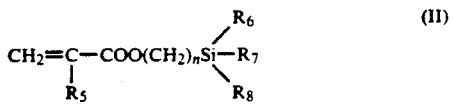

(II)

wherein $R_5$, $R_6$, $R_7$, $R_8$ and n are as defined above. The macromonomer thus prepared has the main skeleton composed of siloxane bond. To Si in the main skeleton is attached directly or indirectly groups such as hydroxyl group, alkoxyl group, aliphatic hydrocarbon group, phenyl group, and group having polymerizable unsaturated bond.

In the compound (A), $R_1$ represents aliphatic hydrocarbon group having 1 to 8 carbon atoms or phenyl group, and $R_2$, $R_3$ and $R_4$ each represent alkoxyl group having 1 to 4 carbon atoms or hydroxyl group. $R_2$, $R_3$ and $R_4$ may be the same or, any or all of the groups may be different.

Examples of alkoxyl groups having 1 to 4 carbon atoms in the compound (A) are straight chain or branched chain alkoxyl groups such as methoxy, ethoxy, propoxy, butoxy and the like. Examples of aliphatic hydrocarbon groups having 1 to 8 carbon atoms in the compound (A) are straight chain or branched chain aliphatic hydrocarbon groups such as methyl, ethyl, propyl, butyl, pentyl, hexyl, heptyl, octyl and the like.

Examples of preferred groups represented by $R_1$ in the compound (A) are methyl, phenyl and the like. Examples of preferred groups represented by $R_2$, $R_3$ and $R_4$ in the compound (A) are methoxy, ethoxy, propoxy, butoxy, hydroxyl and the like. Examples of useful compounds (A) are methyltrimethoxysilane, phenyltrimethoxysilane, butyltrimethoxysilane, methyltriethoxysilane, methyltributoxysilane, phenyltrisilanol, methyltrisilanol and the like. Of these examples, methyltrimethoxysilane, phenyltrimethoxysilane, phenyltrisilanol and the like are more preferable. These compounds can be used singly or at least two of them are usable in mixture.

In the compound (B), $R_5$ represents hydrogen atom or methyl group, $R_6$, $R_7$ and $R_8$ each represent hydroxyl group, alkoxyl group having 1 to 4 carbon atoms or aliphatic hydrocarbon group having 1 to 8 carbon atoms, and n is an integer of 1 to 6. $R_6$, $R_7$ and $R_8$ may be the same or different although all of these groups are not aliphatic hydrocarbon group having 1 to 8 carbon atoms at the same time.

Usable as the aliphatic hydrocarbon groups having 1 to 8 carbon atoms and alkoxyl groups having 1 to 4 carbon atoms in the compound (B) are those exemplified above for the compound (A).

It is preferred to use methoxy, ethoxy and hydroxyl as the groups $R_6$, $R_7$ and $R_8$. Preferred integer range of n is 2 to 4. Examples of useful compounds (B) are γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol, etc. Of these examples, more preferable are γ-methacryloxypropyltrimethoxysilane, γ-methacryloxypropyltriethoxysilane, γ-acryloxypropyltrisilanol, etc. These compounds can be used singly or at least two of them are usable in mixture.

The siloxane-type macromonomer to be used in the invention can be prepared by mixing and reacting the compounds (A) and (B). The reaction employs about 70 to about 99.999 mole %, preferably about 90 to about 99.9 mole %, more preferably about 95 to about 99 mole %, of the compound (A) and about 30 to about 0.001 mole %, preferably about 10 to about 0.1 mole %, more preferably about 5 to about 1 mole %, of the compound (B), based on the combined amount of compounds (A) and (B). Use of less than 70 mole % of the compound (A) is undesirable since gelation tends to occur during copolymerization reaction. Use of over 99.999 mole % of the compound (A) increases the amount of uncopolymerizable polysiloxane, thereby rendering turbid the resin liquid prepared by copolymerization of the macromonomer and vinyl monomer.

When the compounds (A) and (B) are subjected to reaction, there arises condensation of hydroxyl groups with the separation of water which hydroxyl groups are present in the compound (A) and/or (B) or are produced by hydrolysis of alkoxyl present in the compound (A) and/or (B). Depending on the reaction conditions, condensation with the separation of alcohol may partially occur instead.

Although feasible in the absence of a solvent, the reaction of the compounds (A) and (B) is performed preferably in the presence of water or an organic solvent capable of dissolving the compounds (A) and (B). Examples of useful organic solvents are hydrocarbon-type solvents such as heptane, toluene, xylene, octane, mineral spirit and the like; ester-type solvents such as ethyl acetate, n-butyl acetate, isobutyl acetate, methyl cellosolve acetate, butylcarbitol acetate and the like; ketone-type solvents such as methyl ethyl ketone, methyl isobutyl ketone, diisobutyl ketone and the like; alcohol-type solvents such as ethanol, isopropanol, n-butanol, sec.-butanol, isobutanol and the like; and ether-type solvents such as n-butyl ether, dioxane, ethylene glycol monomethyl ether, ethylene glycol monoethyl ether and the like. These solvents can be used singly or at least two of them are usable in mixture.

When a solvent is used, it is suitable that the concentration of compounds (A) and (B) as combined be about 5% by weight or more.

The reaction of the compounds (A) and (B) is carried out at a temperature of about 20° to about 180° C., preferably about 50° to about 120° C. and is completed in about 1 to about 40 hours.

When required, a polymerization inhibitor can be used for the reaction. The polymerization inhibitor is effective in inhibiting the polymerization of unsaturated bond contained in the compound (B) during the reaction of the compounds (A) and (B). Examples of useful polymerization inhibitors are hydroquinone, hydroquinone monomethyl ether, etc.

In preparation of polysiloxane-type macromonomer, the reaction system comprising the compounds (A) and (B) may contain tetraalkoxysilane, dialkyldialkoxysilane or the like in an amount of about 20% by weight or less based on the compounds (A) and (B).

When the groups $R_2$, $R_3$, $R_4$, $R_6$, $R_7$ and $R_8$ are all hydroxyl in the condensation reaction of the compounds (A) and (B), the reaction is preferably conducted with heating and stirring in an organic solvent.

When the compound (A) and/or (B) has alkoxyl group to be attached to Si, hydrolysis is preferably done before condensation. Generally hydrolysis and condensation can be continuously carried out with heating and stirring in the presence of water and a catalyst. The amount of water to be used for the reactions is not specifically limited, but is preferably about 0.1 mole or more per mole of alkoxyl group. Use of less than 0.1 mole of water is likely to hinder the smooth progress of reaction. It is most preferred to use water as a solvent in large excess. When water and a water-soluble organic solvent are conjointly used, the reaction system is rendered uniform where the condensation produces alcohol sparingly soluble in water. Preferred water-soluble organic solvents include those of alcohol-, ester-, ether- and ketone-type as exemplified above.

Usable as the catalyst for the hydrolysis reaction are acid catalysts and alkali catalysts. Specific examples thereof are acid catalysts such as hydrochloric acid, sulfuric acid, phosphoric acid, formic acid, acetic acid, propionic acid, acrylic acid, methacrylic acid and the like and alkali catalysts such as sodium hydroxide, triethylamine, ammonia and the like. The amount of the catalyst is about 0.0001 to about 5% by weight, preferably about 0.01 to about 0.1% by weight, based on the combined amount of the compounds (A) and (B).

The polysiloxane-type macromonomer to be used in the invention has a number-average molecular weight of about 400 to about 100,000, preferably about 1,000 to about 20,000. Use of the polysiloxane-type macromonomer with a number-average molecular weight of less than about 400 is undesirable since it tends to gel the reaction mixture during copolymerization. Use of the polysiloxane-type macromonomer with a number-average molecular weight of more than about 100,000 tends to deteriorate the compatibility, hence undesirable.

The main skeleton of polysiloxane-type macromonomer produced by the reaction of the compounds (A) and (B) is composed of siloxane bond, and generally has a linear or ladder-like structure or a structure comprising a combination of linear and ladder-like portions. Of these, the ladder-like structure and the structure having the ladder-like portions in larger proportion than the linear portions are preferred because the macromonomer of such structures serves to improve the water resistance, heat resistance, light resistance and like properties of the polymer to be produced. The desired type of structure can be obtained by varying the proportions of the compounds (A) and (B), the amounts of water and catalyst, etc. The polysiloxane-type macromonomer has the Si of siloxane bond to which are attached groups such as groups $R_1$ to $R_4$, group

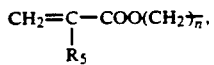

groups $R_6$ to $R_8$, and the like in the formulas (I) and (II). The macromonomer of such structure possesses at least 2 free functional groups such as hydroxyl groups and alkoxyl groups having 1 to 4 carbon atoms (the groups $R_2$ to $R_4$ and $R_6$ to $R_8$) per molecule.

The polysiloxane-type macromonomer has polymerizable unsaturated bonds numbering, on an average, preferably about 0.2 to about 1.9, more preferably about 0.6 to about 1.4, most preferably about 0.9 to about 1.2, per molecule. Presence of a far smaller number of polymerizable unsaturated bonds is undesirable because it is likely to make turbid the liquid reaction product of the macromonomer and the vinyl monomer. Presence of a much larger number of polymerizable unsaturated bonds is apt to cause gelation during the copolymerization reaction, hence undesirable.

Useful vinyl monomers to be copolymerized with the polysiloxane-type macromonomer are, for example, compounds having one polymerizable unsaturated bond per molecule. Examples thereof are esters of acrylic acid or methacrylic acid with monohydric alcohol having 1 to 22 carbon atoms such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate and the like; carboxyl group-containing vinyl monomers such as acrylic acid, methacrylic acid, maleic anhydride and the like; hydroxyl group-containing vinyl monomers such as 2-hydroxyethyl acrylate, 2-hydroxyethyl methacrylate, hydroxypropyl acrylate, hydroxypropyl methacrylate and the like; glycidyl group-containing vinyl monomers such as glycidyl acrylate, glycidyl methacrylate and the like; amide-type vinyl monomers such as acrylamide, methacrylamide, N-methylolacrylamide, N-methylolmethacrylamide and the like; amine-type vinyl monomers such as dimethylaminoethyl methacrylate, 2-diethylaminoethyl methacrylate, tert-butylaminoethyl methacrylate and the like; and other vinyl monomers such as styrene, vinyltoluene, acrylonitrile, methacrylonitrile, α-methyl styrene, vinyl acetate and the like.

The copolymerization of the polysiloxane-type macromonomer with the vinyl monomer in the invention can be carried out in the same manner as the usual process for synthesizing acrylic resin or vinyl resin, for example, by dissolving or dispersing the two components in an organic solvent and heating the solution with stirring to about 60 to about 180° C. in the presence of a radical polymerization initiator. The reaction is usually completed in about 1 to about 10 hours. The proportions of the two components can be suitably varied according to a particular application of the polymer, but it is suitable to use about 1 to about 95% by weight, preferably about 10 to about 70% by weight, of the polysiloxane-type macromonomer and about 99 to about 5% by weight, preferably about 90 to about 30% by weight, of the vinyl monomer, based on the combined amount of the macromonomer and the vinyl monomer. Examples of useful organic solvents include those of the alcohol-type, ether-type, ester-type, hydrocarbon-type and the like as exemplified above. When the hydrocarbon-type solvent is used, it is preferably combined with other solvents to enhance the solubility.

Examples of radical polymerization initiators can be any of those usually used, such as benzoyl peroxide, t-butylperoxy-2-ethylhexanoate and like peroxides, azoisobutyronitrile, azobisdimethyl valeronitrile and like azo compounds, etc.

The polysiloxane-containing resin prepared according to the invention has a number-average molecular weight of about 3,000 to about 500,000, preferably about 5,000 to about 100,000.

The polysiloxane-containing resin can be obtained, as stated above, by subjecting the polysiloxane-type macromonomer and the vinyl monomer to copolymerization reaction which occurs at the polymerizable unsaturated bond contained in the polysiloxane-type macromonomer with the result that the polysiloxane-type macromonomer gets bonded to the resulting copolymer as a pendant side chain. The side chain composed of the polysiloxane-type macromonomer is of linear or ladder-like structure in which at least two free functional groups such as hydroxyl groups and alkoxyl groups are bonded to Si.

The vinyl polymer with such structure is given outstanding surface characterisitics by the presence of the side chain having the siloxane bond. Moreover, the functional groups bonded to Si in the side chain of the vinyl polymer are more reactive than those bonded to Si in conventional vinyl polymers with polysiloxane side chain, and furthermore, at least two such reactive functional groups are present in the side chain of the vinyl polymer of this invention. Therefore, the vinyl polymer of the invention has improved crosslinking property and enhanced compatibility with other components.

The polysiloxane-containing resin prepared in the invention have the advantages of being:
(1) sufficient in crosslinking property even when used singly,
(2) crosslinkable on reaction with the hydroxyl group,
(3) markedly compatible with other organic resins, especially acrylic resin,
(4) water repellent and high in water resistance and chemical resistance,
(5) able to form coats with good weatherability and effective, when mixed with other organic resins, in improving the weatherability,
(6) high in mar resistance,
(7) outstanding in heat resistance, and
(8) excellent in stain resistance.

The invention will be described below in greater detail with reference to the following Examples.

EXAMPLE 1

| | |
|---|---|
| Methyltrimethoxysilane | 2,720 g (20 moles) |
| γ-Methacryloxypropyl trimethoxysilane | 256 g (1 mole) |
| Deionized water | 1,134 g |
| 6% hydrochloric acid | 2 g |
| Hydroquinone | 1 g |

These components were mixed together and reacted at 80° C. for 5 hours. The polysiloxane-type macromonomer thus obtained was found to have a number-average molecular weight of about 2,000 and to possess, on an average, one vinyl group (polymerizable unsaturated bond) and 4 hydroxyl groups, per molecule. The macromonomer (300 g) thus prepared was mixed with the other components listed below.
Styrene: 100 g
Methyl methacrylate: 100 g
n-Butyl acrylate: 500 g
Azoisobutyronitrile: 20 g The mixture was added dropwise to 1,000 g of xylene at 120° C. for copolymerization, giving a transparent copolymer. The copolymer was found to have a number-average molecular weight of about 20,000.

The copolymer was applied to the surface of a steel plate and the coated plate was baked at 120° C. for 30 minutes. The coat was found to have a gel fraction ratio of 73% (with acetone unextracted) and a surface tension of 29 dyne/cm.

EXAMPLE 2

| | |
|---|---|
| Phenyltrisilanol | 7,800 g (50 moles) |
| γ-Acryloxypropyltrisilanol | 200 g (1 mole) |
| Toluene | 4,500 g |

These components were mixed together and reacted at 117° C. for 3 hours for condensation. The polysiloxane-type macromonomer thus obtained was found to have a number-average molecular weight of 7,000 and to possess, on an average, one vinyl group and 5 to 10 hydroxyl groups, per molecule. The macromonomer was mixed with the other components shown below.
2-Hydroxyethyl acrylate: 100 g
Methyl methacrylate: 200 g
2-Ethylhexyl methacrylate: 600 g
Azoisobutyronitrile: 10 g The mixture was added dropwise to 1,000 g of a mixture of butanol and xylene in equal amounts by weight at 120° C. for copolymerization, giving a transparent copolymer. The copolymer was found to have a number-average molecular weight of about 40,000.

The copolymer was tested in the same manner as in Example 1 to determine the gel fraction ratio and the surface tension. The former value was 65% and the latter was 35 dyne/cm.

EXAMPLE 3

Phenyltrimethoxysilane (48 moles) was reacted with 2 moles of γ-methacryloxyethyltriethoxysilane in the same manner as in Example 1. The polysiloxane-type macromonomer thus obtained was found to have a number-average molecular weight of about 5,000 and to possess, on an average, one vinyl group and 5 to 10 methoxy groups, per molecule. The macromonomer (500 g) was copolymerized with 500 g of the vinyl monomer of the type used in Example 1 in the same manner as in Example 1. The resulting copolymer was found to have a number-average molecular weight of about 60,000.

The copolymer was tested by the same method as in Example 1 with the result that the coat thus formed was 81% in gel fraction ratio and 35 dyne/cm in surface tension.

EXAMPLE 4

Methyltrimethoxysilane (29.1 moles) was reacted with 0.9 mole of γ-acryloxyethyltriethoxysilane in the same manner as in Example 1. The polysiloxane-type macromonomer thus obtained was found to have a number-average molecular weight of about 15,000 and to possess, on an average, one vinyl group and 5 to 10 methoxy groups, per molecule. The macromonomer (400 g) was copolymerized with 600 g of the vinyl monomer of the type used in Example 1 in the same manner as in Example 1. The resulting copolymer was found to have a number-average molecular weight of about 70,000.

The copolymer was tested by the same method as in Example 1 with the result that the coat thus formed was 92% in gel fraction ratio and 29 dyne/cm in surface tension.

EXAMPLE 5

Methyltrimethoxysilane (15 moles) was reacted with 1 mole of γ-methacryloxypropylmethyldimethoxysilane in the same manner as in Example 1. The polysiloxane-type macromonomer thus obtained was found to have a number-average molecular weight of about 3,000 and to possess, on an average, one vinyl group and 5 to 10 methoxy groups, per molecule. The macromonomer (500 g) was copolymerized with 500 g of the vinyl monomer of the type used in Example 2 in the same manner as in Example 2. The resulting copolymer was to have a number-average molecular weight of about 40,000.

The copolymer was tested by the same method as in Example 1 with the result that the coat thus formed was 95% in gel fraction ratio and 29 dyne/cm in surface tension.

We claim:

1. A polysiloxane-containing resin dissolved or dispersed in an organic solvent and prepared by a process which comprises copolymerizing a polysiloxane macromonomer with a vinyl monomer in an organic solvent, characterized in that the polysiloxane macromonomer is prepared by reacting about 70 to about 99.999 mole % of a compound (A) represented by the formula

(I)

wherein $R_1$ represents aliphatic hydrocarbon group having 1 to 8 carbon atoms or phenyl group, and $R_2$, $R_3$ and $R_4$ each represent alkoxyl group having 1 to 4 carbon atoms or hydroxyl group with about 30 to about 0.002 mole % of a compound (B) represented by the formula

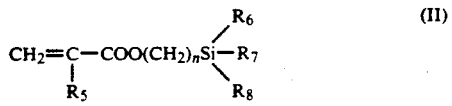

(II)

wherein $R_5$ represents hydrogen atom or methyl group, $R_6$, $R_7$ and $R_8$ each represent hydroxyl group, alkoxyl group having 1 to 4 carbon atoms or aliphatic hydrocarbon having 1 to 8 carbon atoms with the proviso that $R_6$, $R_7$ and $R_8$ cannot be aliphatic hydrocarbon groups having 1 to 8 carbon atoms at the same time, and n is an integer of 1 to 6, the polysiloxane macromonomer having at least two free functional groups per molecule which are selected from the group consisting of hydroxyl and alkoxyl groups and are attached to Si, the macromonomer having a number-average molecular weight of about 400 to about 10,000 and having polymerizable unsaturated bonds numbering, on an average, about 0.6 to about 1.4 per molecule and the resulting polysiloxane-containing resin having a number average molecular weight of 3,000 to 500,000.

2. A polysiloxane-containing resin according to claim 1 wherein $R_1$ in the compound (A) is methyl or phenyl.

3. A polysiloxane-containing resin according to claim 1 wherein $R_2$, $R_3$ and $R_4$ in the compound (A) are each methoxy, ethoxy, propoxy, butoxy or hydroxyl.

4. A polysiloxane-containing resin according to claim 1 wherein $R_6$, $R_7$ and $R_8$ in the compound (B) are each methoxy, ethoxy, or hydroxyl.

5. A polysiloxane-containing resin according to claim 1 wherein n in the compound (B) is 2 to 4.

6. A polysiloxane-containing resin according to claim 1 wherein the compound (A) is at least one compound selected from the group consisting of methyltrimethoxysilane, phenyltrimethoxysilane, butyltrimethoxysilane, methyltriethoxysilane, methyltributoxysilane, phenyltrisilanol and methyltrisilanol and the compound (B) is at least one compound selected from the group consisting of γ-methacryloxypropyltrimethoxysilane, γ-methacryloxypropyltriethoxysilane, γ-acryloxypropyltrimethoxysilane, γ-methacryloxybutyltriethoxysilane and γ-acryloxypropyltrisilanol.

7. A polysiloxane-containing resin according to claim 1 wherein the compound (A) is at least one compound selected from the group consisting of methyltrimethoxysilane, phenyltrimethoxysilane and phenyltrisilanol and the compound (B) is at least one compound selected from the group consisting of γ-methacryloxypropyltrimethoxysilane, γ-methacryloxypropyltriethoxysilane and γ-acryloxypropyltrisilanol.

8. A polysiloxane-containing resin according to claim 1 wherein about 90 to about 99.9 mole % of the compound (A) is reacted with about 10 to about 0.1 mole % of the compound (B).

9. A polysiloxane-containing resin according to claim 1 wherein about 95 to about 99 mole % of the compound (A) is reacted with about 5 to about 1 mole % of the compound (B).

10. A polysiloxane-containing resin according to claim 1 wherein the polysiloxane macromonomer has polymerizable unsaturated bonds numbering, on an average, about 0.9 to about 1.2 per molecule.

11. A polysiloxane-containing resin according to claim 1 wherein the polysiloxane macromonomer has a number-average molecular weight of about 1,000 and about 20,000.

12. A polysiloxane-containing resin according to claim 1 wherein about 1 to about 95% by weight of the polysiloxane macromonomer is reacted with about 99 to about 5% by weight of the vinyl monomer.

13. A polysiloxane-containing resin according to claim 1 wherein about 10 to about 70% by weight of the polysiloxane macromonomer is reacted with about 90 to about 30% by weight of the vinyl monomer.

* * * * *